(12) United States Patent
Xu et al.

(10) Patent No.: US 10,785,813 B2
(45) Date of Patent: Sep. 22, 2020

(54) MOBILE COMMUNICATION NETWORK ATTACHMENT TO WI-FI

(71) Applicant: International Business Machines Corporation, Armonk, NY (US)

(72) Inventors: Ying Ying Xu, Beijing (CN); ShengYan Sun, Beijing (CN); Jin Rong Wang, Beijing (CN); Yu Han Zhang, Beijing (CN); Ya Nan Mo, Beijing (CN); Xiao Hai Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/041,872

(22) Filed: Jul. 23, 2018

(65) Prior Publication Data

US 2020/0029372 A1    Jan. 23, 2020

(51) Int. Cl.
*H04W 4/00* (2018.01)
*H04W 76/11* (2018.01)
*H04W 48/00* (2009.01)
*H04L 29/12* (2006.01)
*H04W 76/15* (2018.01)
*H04W 88/16* (2009.01)

(52) U.S. Cl.
CPC ......... *H04W 76/11* (2018.02); *H04L 61/2007* (2013.01); *H04W 48/17* (2013.01); *H04W 76/15* (2018.02); *H04W 88/16* (2013.01)

(58) Field of Classification Search
None
See application file for complete search history.

(56) References Cited

U.S. PATENT DOCUMENTS

| 2012/0170574 | A1* | 7/2012 | Huttunen | H04L 12/66 370/352 |
| 2013/0324087 | A1 | 12/2013 | Zhong | |
| 2016/0119052 | A1* | 4/2016 | Frerking | H04B 7/18506 455/431 |
| 2016/0135222 | A1* | 5/2016 | Jain | H04W 74/04 370/329 |
| 2017/0196045 | A1 | 7/2017 | Mohebbi | |
| 2018/0220479 | A1* | 8/2018 | Shu | H04W 88/16 |
| 2018/0270882 | A1* | 9/2018 | Sung | H04L 61/1511 |
| 2019/0021033 | A1* | 1/2019 | Liu | H04W 36/08 |

FOREIGN PATENT DOCUMENTS

| CN | 103517339 A | 1/2014 |
| CN | 205265927 U | 5/2016 |

* cited by examiner

*Primary Examiner* — Elisabeth Benoit Magloire
(74) *Attorney, Agent, or Firm* — Jorge R. Maranto

(57) ABSTRACT

A computer-implemented process for an attachment process to a network. The method comprises, receiving a data request from a user equipment, connecting the user equipment is to a mobile communication network through a first base station, determining a router bound to the user equipment, connecting the router to the mobile communication network through a second base station, establishing a connection between the user equipment and the router through the first base station and the second base station.

17 Claims, 9 Drawing Sheets

MOBILE COMMUNICATION NETWORK ATTACHMENT TO WI-FI

BACKGROUND

Embodiments of the disclosure relate to wireless mobile communication. More specifically, embodiments of the disclosure relate to a method, a system, and a computer program product for providing network access via a mobile communication network.

Accessing the Internet on a mobile device has become very popular. Typically, users on mobile devices access the Internet through a mobile communications network or by wirelessly connecting to a router that has access to a broadband network.

Problems arise when a user accesses the Internet on a mobile communications network during peak hours of high traffic. At these times, mobile communication networks suffer from congestion that causes slow performance. Problems also arise for users that attempt to access the Internet through available Wi-Fi networks. Wi-Fi enabled networks generally offer superior Internet performance, but users are restricted by the short range of the network. Users suffer performance and connectivity issues the further away they move from the source of the Wi-Fi.

Generally, mobile devices will continue accessing the Internet through a Wi-Fi network as long as it is within range of the network. In some instances, the mobile communications network may offer better Internet performance than the Wi-Fi network, but if the mobile device is within range of the Wi-Fi network, it will continue to rely on that network to access the Internet. Users in this scenario must manually turn off the Wi-Fi capabilities of their mobile devices to force the device to switch networks.

SUMMARY

The present disclosure is directed to a computer-implemented method for a mobile communication network that satisfies the need for more reliable Internet access on a mobile device. The computer-implemented method comprises the steps of: receiving a request from a user equipment such as a mobile device or laptop. The user equipment making the request is connected to a mobile communications network through at first base station. Once the request is received, the system proceeds by determining a router that is bound to the user equipment. The determined router is also connected to the mobile communications network through a second base station. Once the system determines the router, the system proceeds by establishing connections between the user equipment and the router through the first base station and the second base station.

According to another embodiment of the present disclosure, a system, which may comprise one or more processors and a memory coupled to at least one of the one or more processors, is provided. The system may further comprise a set of computer program instructions stored in the memory and executed by at least one of the one or more processors in order to perform actions of: receiving a request from a user equipment such as a mobile device or laptop. The user equipment making the request is connected to a mobile communications network through at first base station. Once the request is received, the system proceeds by determining a router that is bound to the user equipment. The determined router is also connected to the mobile communications network through a second base station. Once the system determines the router, the system proceeds by establishing connections between the user equipment and the router through the first base station and the second base station.

According to a further embodiment of the present disclosure, a computer program product is provided. The computer program product may comprise a computer readable storage medium having program instructions embodied therewith. The program instructions may be executable by a device to perform a method. The method comprises the steps of: receiving a request from a user equipment such as a mobile device or laptop. The user equipment making the request is connected to a mobile communications network through at first base station. Once the request is received, the next step of the method determines a router that is bound to the user equipment. The determined router is also connected to the mobile communications network through a second base station. Once the method determines the router, the next step of the method establishes connections between the user equipment and the router through the first base station and the second base station.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
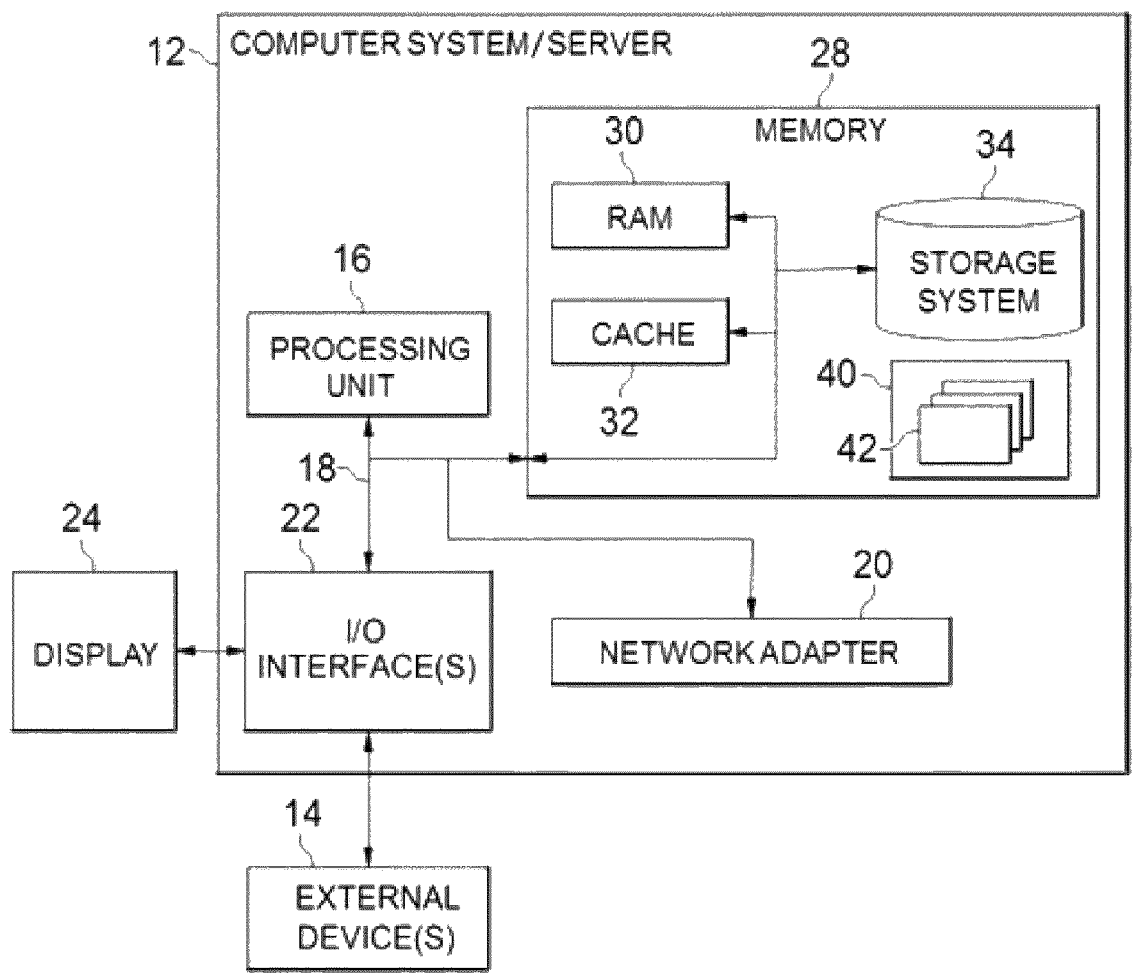
FIG. 1 shows an exemplary computer system which is applicable to implement the embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Referring now to FIG. 1, in which an exemplary computer system/server 12 which is applicable to implement the embodiments of the present disclosure is shown. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, a computer system/server 12 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 includes computer system readable media in the form of volatile memory, such as random access memory (RAM) 30 and/or cache memory 32. The computer system/server 12 may further include other removable/non-removable, volatile/non-volatile computer system storage media. By way of example only, the storage system 34 can be provided for reading from, and for writing to a non-removable, non-volatile magnetic media (not shown and typically called a "hard drive"). Although not shown, a magnetic disk drive for reading from, and for writing to a removable, non-volatile magnetic disk (e.g., a "floppy disk"), and an optical disk drive for reading from, or for writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the disclosure.

The program/utility 40, having at least one program modules 42, may be stored in the memory 28. By way of example, and not limitation, the program/utility 40 may be an operating system, one or more application programs, other program modules, and program data. The operating system, one or more application programs, other program modules, and program data or some combination thereof, may include an implementation of a networking environment. The program modules 42 generally carry out the functions and/or methodologies of the embodiments of the disclosure as described herein.

The computer system/server 12 may also communicate with one or more external devices 14 (e.g., a keyboard, a pointing device, a display 24, etc.), one or more devices that enable a user to interact with the computer system/server 12, and/or any other devices that enable computer system/server 12 to communicate with one or more other computing devices (e.g., network card, modem, etc.). Such communication can occur via an Input/Output (I/O) interface 22. Also, the computer system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via the bus 18. Although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
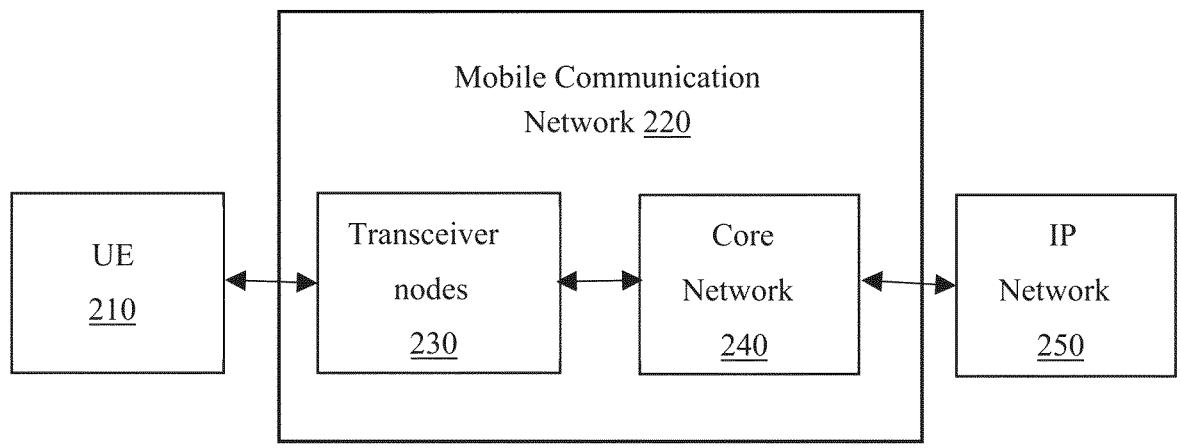
FIG. 2 shows a diagram illustrating an exemplary mobile communication network which provides the framework for the embodiments of the present invention.

FIG. 2 depicts an illustrative diagram of a mobile communication network 220 which provides the framework for the embodiments of the present disclosure. For purposes of simplicity, only the portions of the mobile communications network 220 that are relevant to embodiments of the present disclosure are described. As shown, FIG. 2 comprises a user device (UE) 210 that connects to a transceiver node 230. For example, the transceiver node 230 may be a base station for a radio wave network. The transceiver node 230 transmits data, obtained wirelessly from the UE 210, to a core network 240 of the mobile communication network 220. The mobile communication network 220 is communicatively coupled to one or more Internet Protocol (IP) networks 250 such as the Internet.

The mobile communication network 220 may support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The mobile communication network 220 includes one or more networks based on such standards. For example, in one embodiment of the disclosure, the mobile communication network 220 comprises one or more of a Long Term Evolution (LTE) networks, a LTE Advanced (LTE-A) network, an Evolution Data Only (EV-DO) network, a GPRS network, a Universal Mobile Telecommunications System (UMTS) network, etc.

One or more user equipment 210, hereinafter "UE", are communicatively coupled to the mobile communication network 220. The UE 210 may be wireless communication devices such as two-way radios, cellular telephones, mobile phones, smartphones, two-way pagers, wireless messaging devices, laptop computers, tablet computers, desktop computers, personal digital assistants, and other similar devices.

The UE 210 accesses the wireless mobile communication network 220 through one or more transceiver nodes 230 using one or more radio wave interfaces established between the UE 210 devices and the transceiver nodes 230. The transceiver nodes 230 are also known as a base transceiver station (BTS), a Node B, and/or an Evolved Node B (eNodeB) depending on the technology being implemented within the mobile communication network 220. Throughout this discussion the transceiver node 230 is also referred to as a "base station" or "base". In a 4G LTE network, the eNodeB communicates directly with the core network 240 of the mobile communication network 220.

With advancements in mobile communication networks 220 (e.g., 4G mobile networks), downloading content, streaming audio/video media, and browsing websites has become very fast. However, at times the mobile communication network 220 connection may not be stable. At some times of the day or in particular places, the speed of the mobile communications network 220 connection may be very poor, which makes the access to the Internet slow or even unavailable.

A mobile device user may have Internet access capabilities through a Wi-Fi network. Typically, a Wi-Fi network is constructed with a Wi-Fi enabled router which accesses the Internet through a broadband network. Routers that incorporate a digital subscriber line (DSL) modem, or a cable modem with a Wi-Fi access point, are often set up in homes and other buildings. The routers provide Internet access and internetworking to all devices connected to them, wirelessly or via ethernet cables. Wi-Fi networks provide Internet access via a broadband network that has a much broader band. The broader band makes the connection stable and fast. However, the drawback of the Wi-Fi connection is that its range is very limited.

Aside from providing a broadband network, routers may also connect to other Local Area Networks (LAN), private clouds, storage devices, etc. However, due to the limited range of Wi-Fi connections, a mobile device user may not have access to the LAN or the private cloud that is connected to the router if the user is out of the range of the Wi-Fi. Therefore, techniques for improved network access for the UE 210 is desirable.

Embodiments of the disclosure combine the advantage of wide coverage that mobile communication networks 220 offer with the stability and network connection speed of a Wi-Fi network. To establish network access, embodiments of the disclosure establish a connection between a UE 210 and a router through the mobile communication network 220. The UE 210 will then have access to the Internet via the network connection established with the router.

Figure 3:
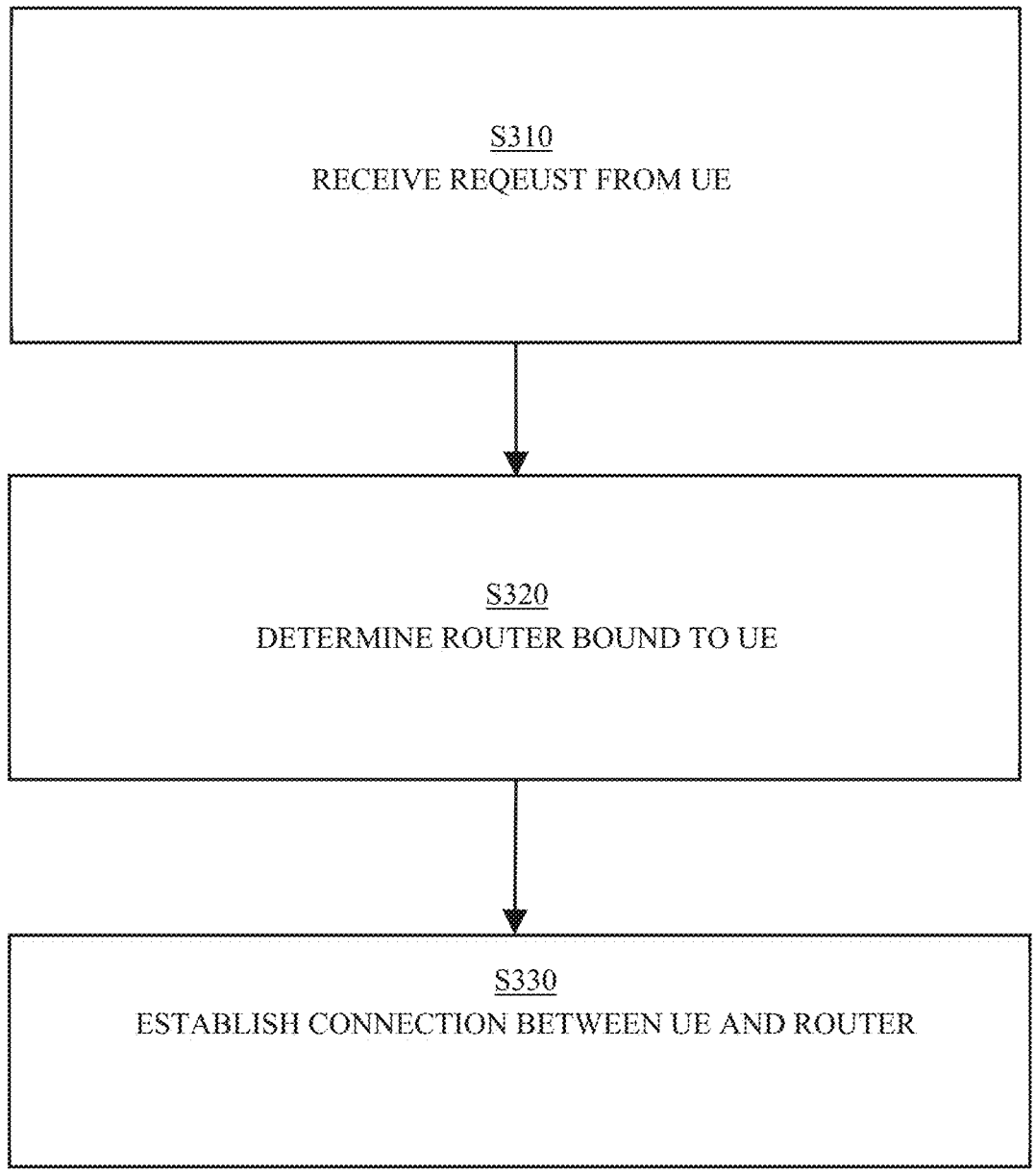
FIG. 3 depicts a flow chart of a method for providing network access according to an embodiment of the present invention.

FIG. 3 illustrates a flow diagram of a process for providing network access according to an embodiment of the present disclosure. The process of flow diagram comprises the steps of receiving a request from a UE 210, determining a router that is bound to the UE 210, and establishing a connection between the UE 210 and the router.

The network access process begins by receiving a request from a UE 210. This is illustrated at step S310. For example, the UE 210 may attempt to connect to a first base station through a radio wave connection. The request of the UE 210 is transferred to a core network 240 of a mobile communication network 220 via the first base station. The request of the UE 210 is then transmitted to an IP network 250 for verification.

According to an embodiment of the present disclosure, the request from a UE 210, at step S310, may be an attach request. The UE 210 needs to register with a mobile communication network 220 to receive services from the network. Registration with a mobile communication network 220 is called Network Attachment. Network Attachment may be performed when the UE 210 is powered on and/or during the initial access of the mobile communication network 220. The request from the UE 210 may include identification information and other validating credentials (e.g., SIM card information).

After receiving the request from a UE 210, the network access process determines a router that is bound to the UE 210. This is illustrated at step S320. Similar to the UE 210, the router connects to a second base station 230 through a radio wave network. The router then connects to a core network 240 via the second base station.

According to an embodiment of the present disclosure, a router binds to the UE 210 prior to the network access process. The binding information may be stored in the core network 240 or the base station 230 associated with the router. Utilizing the stored binding information, the network access process determines the router that is bound to the UE 210.

According to an embodiment of the present disclosure, a router may be equipped with a SIM card to connect to a mobile communication network 220 that utilizes the SIM card credentials. The SIM card information may also be used as uniquely identify information that binds the router with the UE 210.

Upon receiving the request from the UE 210, the network access process retrieves information that identifies the UE 210. Utilizing the identifying information, the core network 240 searches the stored binding information to determine the router that is bound to the UE 210.

After determining the router that is bound to the UE 210 making the request, a connection is established between the UE 210 and the router via the first base station and the second base station. This is illustrated at step S330. For example, once the router that is bound to the UE 210 is determined, the second base station that is connected to the router is identified. If the UE 210 and the router are connected to the same base station of a mobile communication network 22, then the established connection will consist of the radio wave connection that is between the UE 210 and the first base station 230 and the radio wave connection that is between the second base station 230 and the router. However, if the first base station is different from the second base station, a tunnel may be established between the first base station and the second base station. In that case, a connection would be established between the UE 210 and the router via the radio connection that is established between the UE 210 and the first base station 230, through the tunnel between the first base station 230 and the second base station 230, and through the radio wave connection that is established between the second base station 230 and the router.

It should be understood that any suitable tunneling technique may be used to establish a tunnel between the first base station 230 and the second base station 230. For example, the tunneling technique can be Generic Routing Encapsulation (GRE) between two base stations 230, or any other tunneling scheme. GRE is a tunneling protocol that can be used to encapsulate network layer protocols inside virtual point-to-point links over an IP network. The two ends of a GRE tunnel are defined by a source IP address and a destination IP address.

Once a UE 210 establishes a connection with a router, data packages from the UE 210 may be sent to the router via the associated base stations 230. When the router connects to a broadband network, the UE 210 may be connected to a broadband network via the connection between the UE 210 and the router.

In the following embodiments, a 4G LTE network is used as an example of a wireless mobile communication network 220 to further describe the details of the present disclosure. It should be understood that the embodiments of the present disclosure may also apply to other kinds of mobile communication networks 220.

Figure 4:
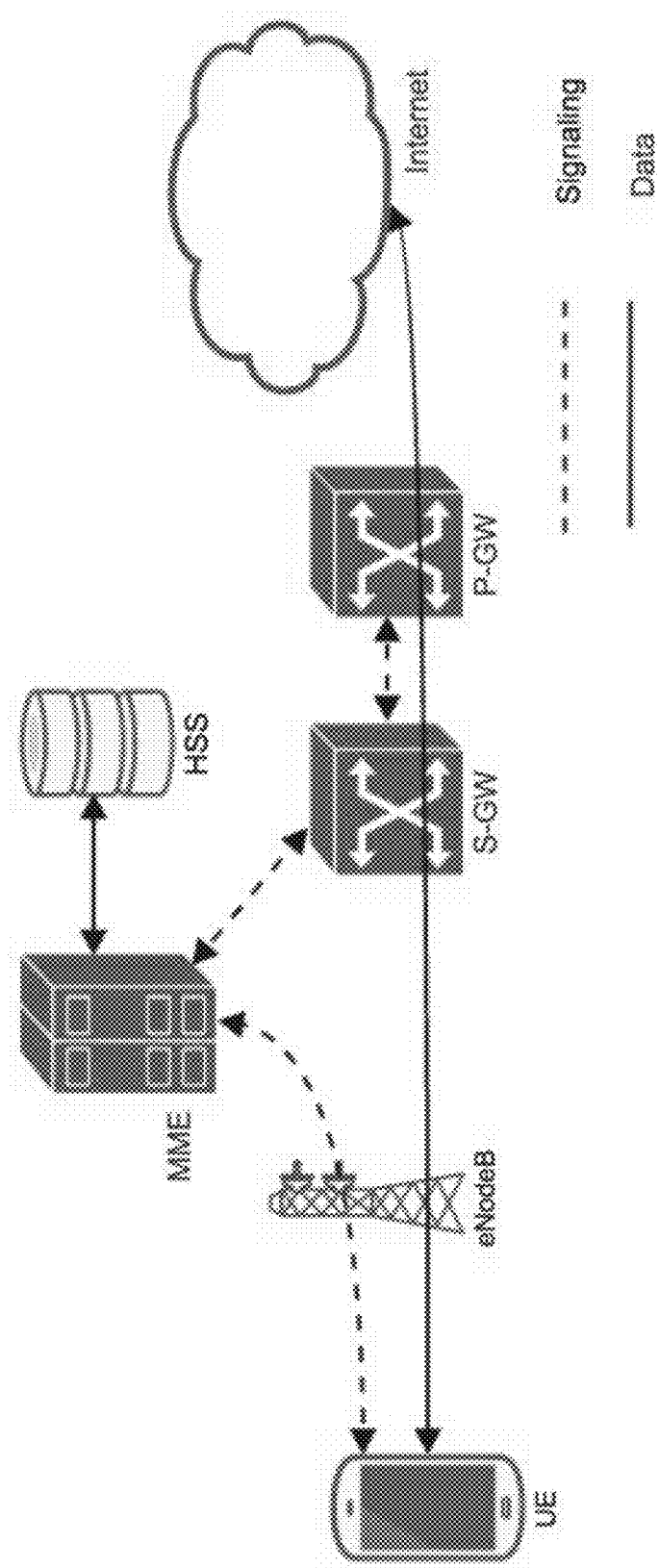
FIG. 4 shows a typical architecture of an LTE network.

FIG. 4 shows the typical architecture of a 4G LTE network. For purposes of simplicity, only the portions of the 4G LTE network that are relevant to embodiments of the present disclosure are described. The 4G LTE network includes a eNodeB, MME (Mobility Management Entity), S-GW (Serving Gateway), P-GW (Packet Data Network Gateway), HSS (Home Subscriber Server). The functions of those portions are described as below.

E-UTRAN Node B, also known as Evolved Node B or "eNodeB" is an element of an LTE network. Functions of the eNodeB include Radio Resource Management functions, IP header compression, encryption of user data streams, selection of an MME, routing of user plane data to S-GW, scheduling and transmission of a paging message.

The functions of a mobility management Entity or "MME" include NAS signaling (eMM, eSM) and security, AS security, tracking area list management, P-GW and S-GW selection, handovers (intra- and inter-LTE), authentication, and bearer management.

The functions of a signaling gateway or "S-GW" include the local mobility anchor point for inter-eNodeB handover, downlink packet buffering and initiation of network-triggered service requests, lawful interception, accounting on user and QCI granularity, and UL/DL charging per UE 210.

The functions of a packet data network gateway or "P-GW" include UE 210 IP address allocation, packet filtering and PDN connectivity, UL and DL service-level charging, gating, and rate enforcement.

The functions of a home subscriber server or "HSS" include concatenation of the HLR (Home Location Register) and the AuC (Authentication Center). The HLR part of the HSS oversees storing and updating the database containing all the user subscription information when necessary.

A UE 210 needs to register with an LTE network to receive services from the LTE network. The registration process is called Network Attachment (attach process). Network Attachment may be performed when the UE 210 is powered on, but also during the initial access of the network. IP connectivity for the UE 210 is enabled by establishing a bearer during the Network Attachment process.

Figure 5:
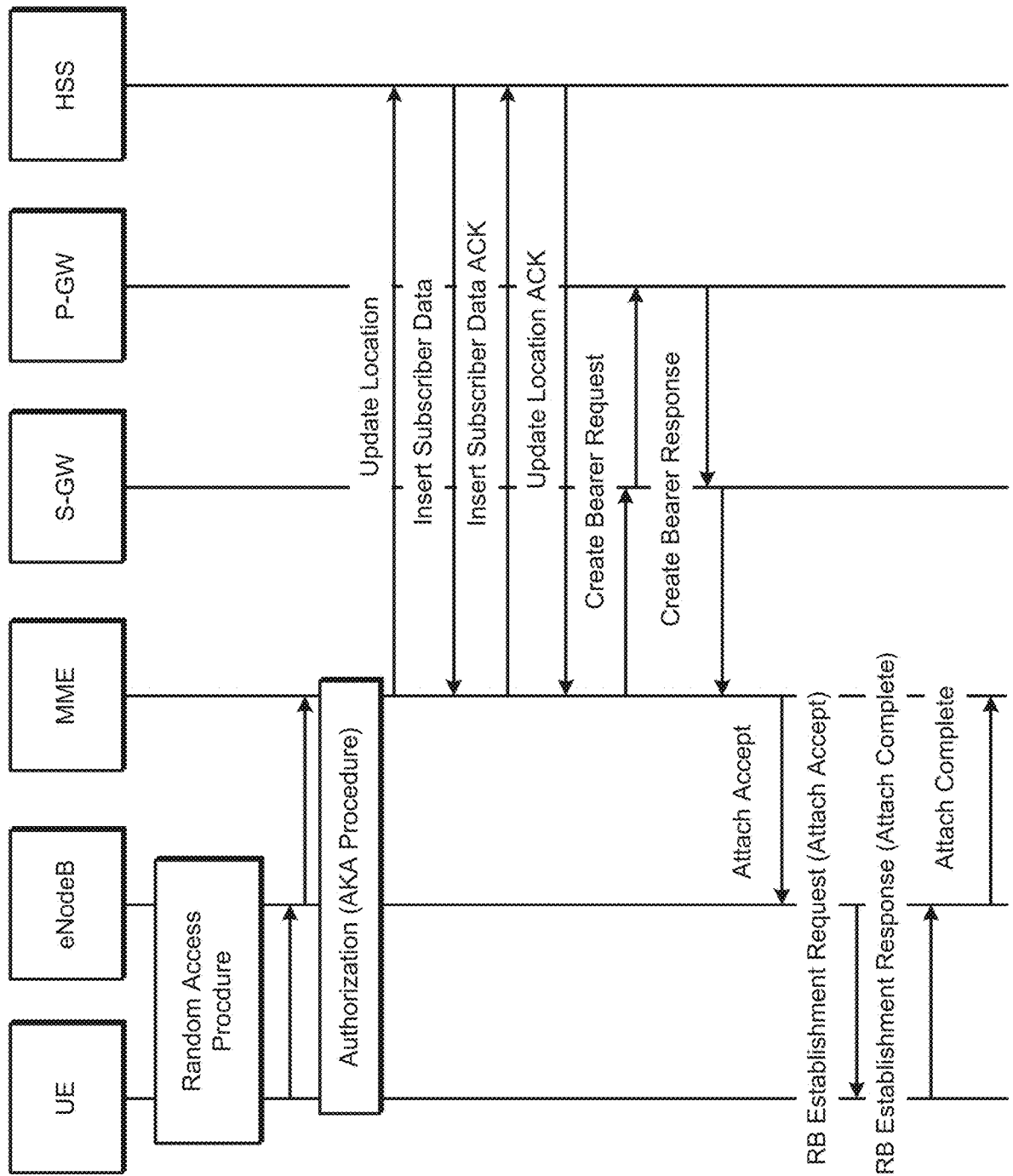
FIG. 5 shows an illustrative message flow of a UE's attach process in a typical LTE network.

FIG. 5 shows an illustrative flow of an attach process of a UE 210 to a typical LTE network, according to one embodiment of the disclosure. First, a UE 210 establishes a connection with an associated eNodeB. The UE 210 sends an Attach Request to the eNodeB which is sent to an MME. If the network is not able to identify the UE 210 using the Identifying information given in the Attach Request message, the network will utilize the identification to follow the Authentication and Security Mode procedures. The MME updates an HSS with the location of the UE 210 using the Update Location request message. The MME also requests the subscriber profile from the HSS using the same request message. The HSS updates its database with the current location of the UE 210 and sends the subscriber profile information to the MME in an Update Location Acknowledge message. The MME then sends a create bearer request to a S-GW. The S-GW creates the default bearer for the UE 210 and requests a P-GW to create a bearer for the UE 210 between the S-GW and the P-GW to provide end-to-end bearer connectivity. The P-GW then creates the bearer and allocates an IP Address for the UE 210. Once the S-GW receives the response from the P-GW, the S-GW responds with a create bearer response to the MME. The MME may now establish the bearer between the eNodeB and the S-GW. The MME sends the Attach Accept message to the eNodeB. After receiving an Attach Accept message, the eNodeB now establishes the Radio Bearer with the UE 210 completing the attach process.

Once the attach procedure succeeds, a context is created for the UE 210 in the MME. A default bearer is established at the UE 210, eNodeB, S-GW and P-GW. Once the UE 210 establishes IP connectivity, the UE 210 can start to use IP-based Internet services.

Figure 6:
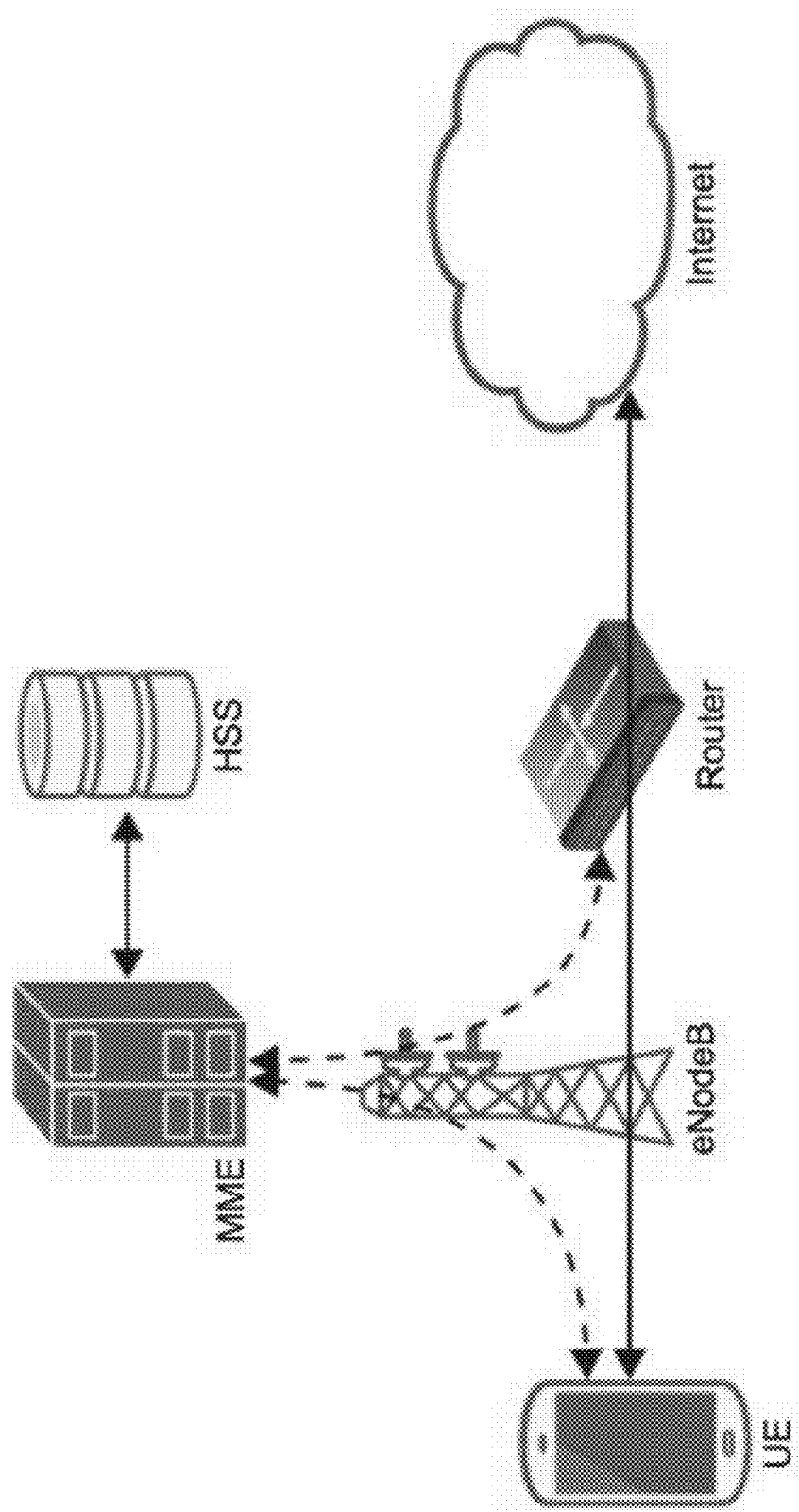
FIG. 6 shows an illustrative architecture of a mobile communication network according to an embodiment of the present invention.

FIG. 6 shows an illustrative architecture of a mobile communication network 220 according to an embodiment of the present disclosure. In the architecture, a connection may be established between a UE 210 and a router that is bound to the UE 210 via a base (eNodeB). The UE 210 may have broadband network access via the established connection between the UE 210 and the router. At times, the base may redirect the requests from the UE 210 to the router instead of the MME in a core network 240 of the UE 210. The router will retrieve the requested data from the broadband network that it is connected to. The router will then send the data to the base which then sends it to the UE 210. Using this method, the UE 210 can utilize the broadband network via a bounded router. This ensures better Internet network speeds compared to Internet network access from a mobile communication network 220 while at the same time having a wider range than Wi-Fi connectivity.

According to an embodiment of the present disclosure, the router may be equipped with a SIM card. The router's SIM card may be registered with the network. The user may open an account for a UE 210 SIM card in the operator's system. The information of the SIM card may be stored in the HSS, and marked as a UE 210. The user may also open an account for the router's SIM card in the operator's system. The SIM card's information may be stored in the HSS as well, and marked as a router. According to an embodiment of the present invention, a new field may be added in the HSS to mark whether the equipment using the SIM card is a router or a UE 210. For example, the new field may be defined as Is_Router, with "1" indicating a router and "0" indicating a UE 210. The user may request to bind the UE 210 SIM card with the router SIM card. The binding information may be recorded in the HSS. An example of the binding table 1 is shown as below:

TABLE 1

| Router identifier | UE identifier |
| --- | --- |
| Router ID1 | UE ID1 |
| Router ID1 | UE ID2 |
| Router ID2 | UE ID3 |

Figure 7:
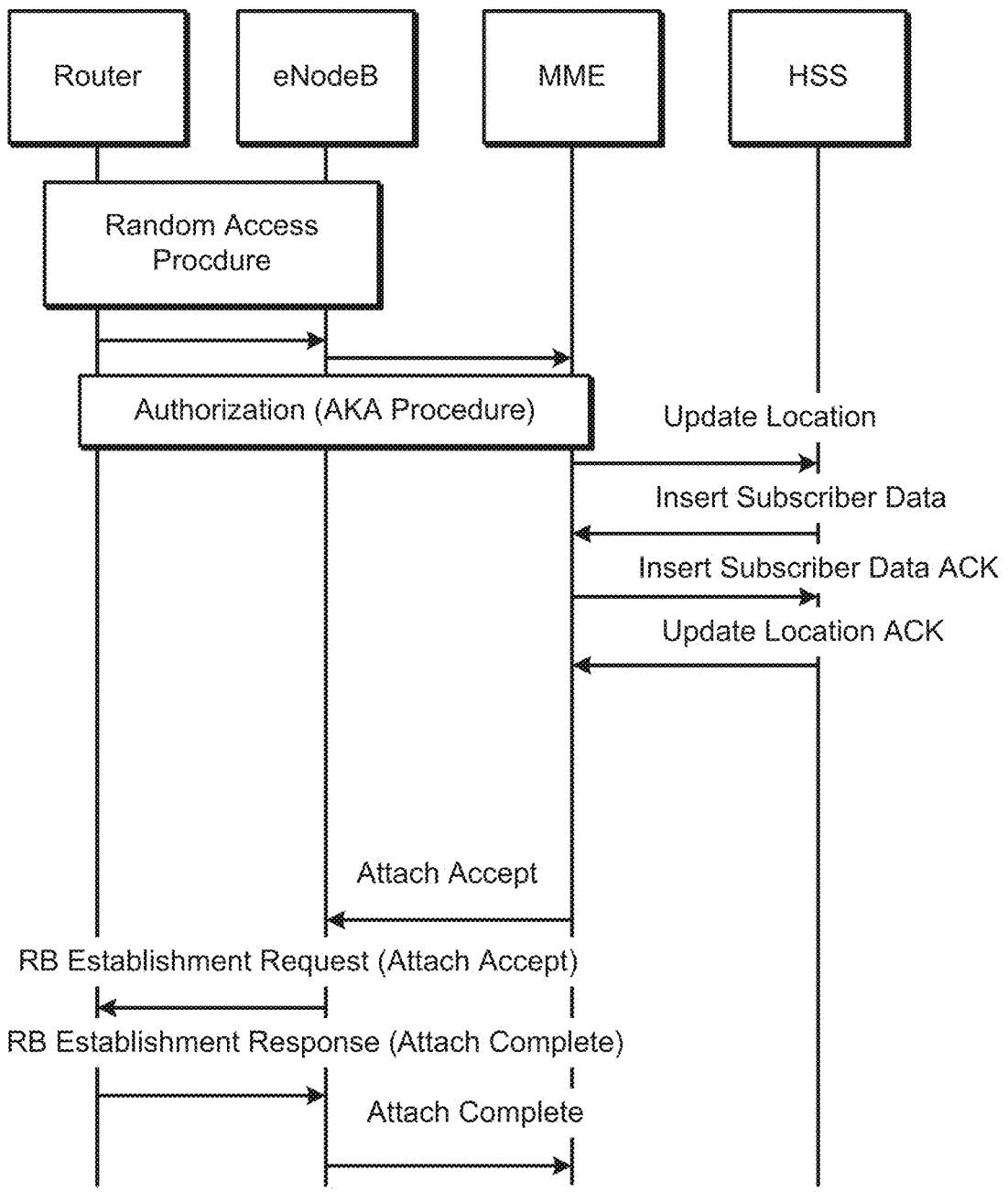
FIG. 7 shows an illustrative message flow of a router's attach process according to an embodiment of the present invention.

FIG. 7 shows an illustrative embodiment of a message flow representing a router attach process according to an embodiment of the present disclosure. A router may request to attach to the LTE network upon start up. The attach request is sent to an associated eNodeB, and is then to an MME. The MME sends the request to an HSS for authentication. The request may include the router's SIM card information. The HSS retrieves the subscriber data for the router, and sends the data back to the MME. Utilizing the subscriber data from the HSS, the MME determines that the request came from a router (for example, the value of Is_Router is "1"). Upon determining that the request is a router, the MME process will differ from the attach process of a UE 210. In a UE 210 MME attach process, the process sends a bearer request to a S-GW and a P-GW. In the router MME attach process, a radio bearer between the router and the eNodeB is created, and the IP addresses of the router and the eNodeB is stored in the MME and the HSS.

Figure 8:
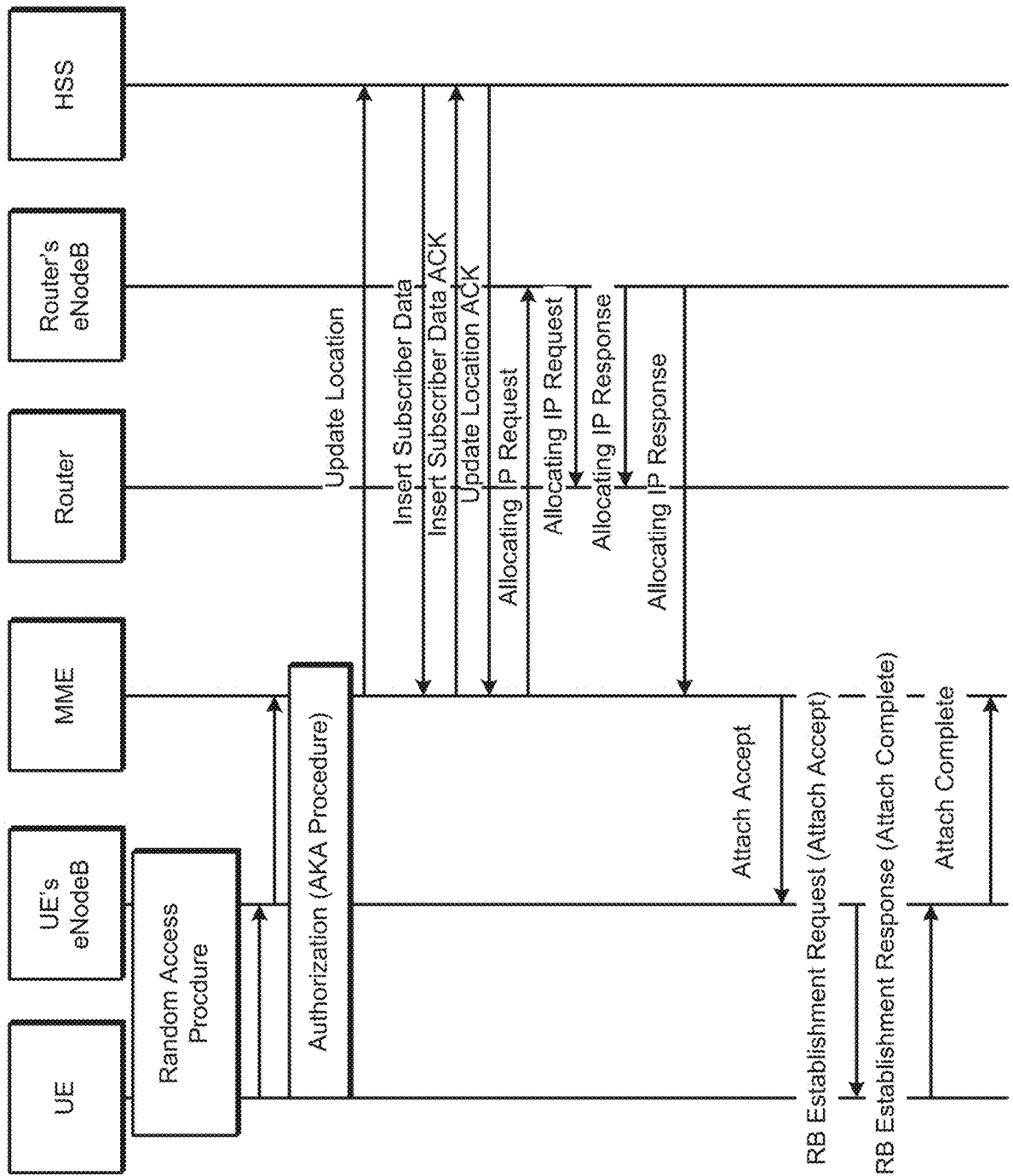
FIG. 8 shows an illustrative message flow of a UE's attach process according to an embodiment of the present invention.

FIG. 8 shows an illustrative embodiment of a message flow representing a UE 210 attach process according to an embodiment of the present disclosure. In the embodiment, a UE 210 requests to attach to an LTE network upon start up. The attach request is sent to an associated eNodeB, and is then to an MME. The MME sends the request to an HSS for authentication. In one example, the request includes the UE 210 SIM card information. The HSS retrieves the subscriber data for the UE 210, and then sends back the data to the MME. Utilizing the subscriber data, the MME determines that the attach request is from a UE 210 and that there is a router bound to the UE 210. The MME then requests an eNodeB, that is associated with the router, to send an allocating IP address request to the router that is bound to the UE 210. The router' eNodeB sends an allocating IP address request to the router causing the router to respond back with an allocated IP address. The router sends the allocated IP address to the router's eNodeB, and the MME. The MME sends the attach accept message and the allocated IP address to the UE's 210 eNodeB and the UE 210. Utilizing the allocated IP address for the UE 210, a connection is established between the UE 210, the UE's eNodeB, the router's eNodeB, and the router. The UE 210 attach process is completed.

Figure 9:
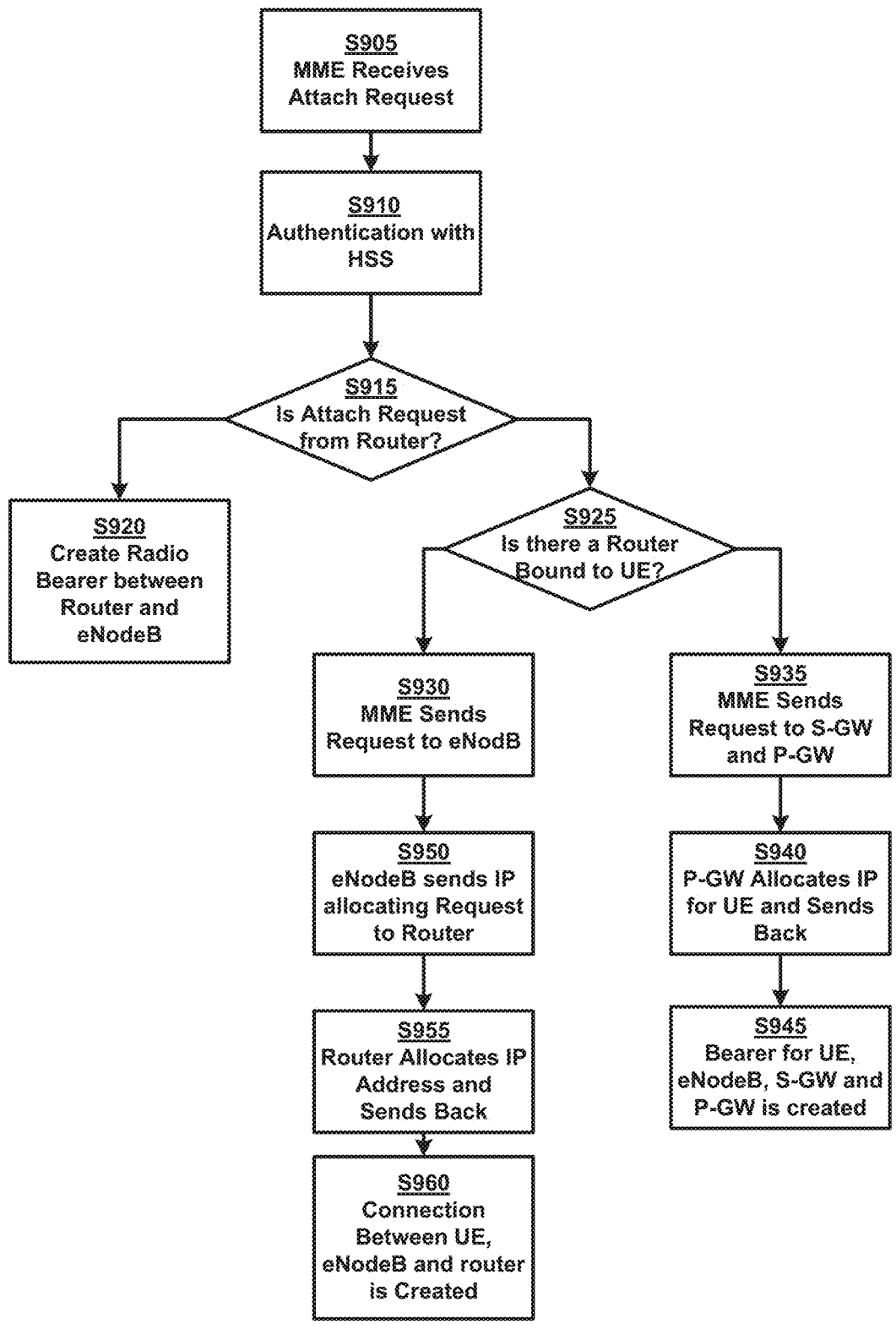
FIG. 9 is a flow chart showing a method for providing network access according to an embodiment of the present invention.

FIG. 9 is a flow diagram of an attach process according to one illustrative embodiment. The attach process comprises the steps of receiving an attach request, authenticating with an HSS, determining whether the attach request is from a router or a UE 210. If the attach request came from a router, the process creates a radio bearer. If the attach request came from a UE 210, the process determines whether there is a router bound to the UE 210. If there is a router bound to the UE 210, then the process continues by sending request to an eNodeB and establishes a connection between the UE 210, the eNodeB, and the bounded router. If there is no router bounded to the UE 210, then the process sends a request to an S-GW and P-GW and a bearer is created for the UE 210, eNodeB, S-GW, and P-GW.

The attach process begins with an MME receiving an attach request from a device. This is illustrated at step S905. The attach request may be from a UE 210 or a router. The attach request may include the SIM card information of the UE 210 or the router. In one embodiment, a UE 210 requests to attach to an LTE network upon startup. Similarly, a router may request to attach to an LTE network upon startup as well. In order for the MME to receive an attach request, the attach request is sent by an eNodeB associated with the device. It is the eNodeB that sends the request to the MME.

Once the MME receives the attach request, the MME communicates with an HSS to authenticate the device. This is illustrated at step S910. The MME sends the attach request to the HSS. The HSS responds by sending back authentication information to the MME.

After the authentication information is received, the process determines whether the attach request came from a router. This is illustrated at step S915. In one embodiment of this step, a new field Is_Router may be added onto the HSS to determine whether the SIM card attached equipment is a router or a UE 210. For example, the field with "1" may indicate a router and a "0" may indicate a UE 210. During the attach request, the MME may retrieve the Is_Router information from the HSS. Utilizing the Is_Router information, the MME identifies whether the attach request is from a router or from a UE 210.

If it is determined in step S915 that the request came from a router, the process creates a radio bearer between the router and the associated eNodeB. The IP addresses of the router and the router eNodeB is stored in the MME and the HSS. This is illustrated at step S920.

If it is determined in step S915 that the request is from a UE 210 and not a router, the process determines whether there is a router bound to the UE 210. This is illustrated at step S925. In one embodiment of this step, the binding information is recorded in the HSS. If the HSS finds that a router has been bound to the UE 210, the HSS will send the binding information back to the MME. Utilizing the binding information, if the MME determines in step S925 that there is a router bounded to the UE 210, the process proceeds to step S930.

If the process determines that there is a router bound to the UE 210, the MME sends a request to the router's eNodeB, asking the router's eNodeB to send an allocating IP address request to the router. This is illustrated at step S930.

Upon receiving the request, the router's eNodeB will send an allocating IP address request to the router. This is illustrated at step S950.

After receiving the IP allocation request, the router allocates an IP address for the UE 210. The router then sends the IP address back to the UE 210 via the router's eNodeB, the MME, and the UE's eNodeB. This is illustrated at step S955. Utilizing the IP address, the UE 210 establishes a connection with the router. This is illustrated at step S960. A radio bearer between the UE 210, the eNodeB(s) and the router will be created. The routing record of the UE 210 and corresponding bounded router is saved on the UE's eNodeB and the router's eNodeB if it exists.

However, if the process determines that there is no router bound to the UE, the normal process to connecting to a mobile communications network 220 will be used. Connecting to a mobile communications network begins by having the MME send a create bearer request to a S-GW and a P-GW. This is illustrated at step S935. The P-GW allocates an IP address for the UE 210, and sends the IP address back to the MME, the eNodeB, and the UE 210. This is illustrated at step S940. The bearer for the UE 210, the eNodeB, the S-GW and the P-GW is created. This is illustrated at step S945.

When a eNodeB associated with a UE210 receives a service request from the UE 210 (the uplink data) several options are available. If the UE 210 and the router are using the same eNodeB, the eNodeB will redirect the service request directly to the router. Otherwise, a tunnel may be created between the UE's eNodeB and the router's eNodeB. It should be understood that any suitable tunneling method may be used to establish tunnel between two eNodeBs in the LTE network. The service request will be sent to the router's eNodeB through the tunnel. The router's eNodeB will send the service request to the router in accordance with a routing record. Utilizing a broadband network connected to the router, the router will visit the destination address and the source address stored in the service request of the UE's IP address.

Once the router receives the data packages from the broadband network (the downlink data), the router may proceed in several ways. If the UE 210 and the router are using the same eNodeB, the eNodeB will redirect the data packages directly to the UE 210. Otherwise, the router will send the data packages through the tunnel that is established between the UE's 210 eNodeB and the router's eNodeB. The data packages are sent to the UE's eNodeB. Upon receiving the data packages, the UE's eNodeB will send the data packages to the UE 210 in accordance with the routing record.

It should be understood that a 4G LTE network has been used only as an illustrative example of a wireless mobile communication network 220. The details and methods of the embodiments of the present disclosure may also apply to other kinds of wireless communication networks.

It should be understood that a broadband network has been used here as an illustrative example of a network connected to a router. As described previously, the router may also connect to other networks such as a LAN, a private cloud, etc. The embodiments of the present disclosure may also apply to other kinds of networks connected to the router.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, there is provided a system, which may comprise one or more processors and a memory coupled to at least one of the one or more processors. The system may further comprise a set of computer program instructions stored in the memory and executed by at least one of the one or more processors in order to perform actions of estimating a value range of a water body parameter based on measured data for a water quality indicator of a first set of time-spatial points and measured data for the water quality indicator of a second set of time-spatial points; and determining an optimal value of the water body parameter from the estimated value range by comparing the measured data for the water quality indicator of the second set and simulated data for the water quality indicator of the second set, wherein the simulated data for the water quality indicator of the second set is obtained based on a fluid dynamic model using the measured data for the water quality indicator of the first set as an input of the fluid dynamic model and using a value in the estimated value range as a parameter of the fluid dynamic model.

According to an embodiment of the present disclosure, there is provided a computer program product. The computer program product may comprise a computer readable storage medium having program instructions embodied therewith. The program instructions may be executable by a device to perform a method. The method may comprise estimating a value range of a water body parameter based on measured data for a water quality indicator of a first set of time-spatial points and measured data for the water quality indicator of a second set of time-spatial points; and determining an optimal value of the water body parameter from the estimated value range by comparing the measured data for the water quality indicator of the second set and simulated data for the water quality indicator of the second set, wherein the simulated data for the water quality indicator of the second set is obtained based on a fluid dynamic model using the measured data for the water quality indicator of the first set as an input of the fluid dynamic model and using a value in the estimated value range as a parameter of the fluid dynamic model.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   receiving a request from a user equipment, the user equipment being connected to a mobile communication network through a first base station;
   determining a router bound to the user equipment, the router being connected to the mobile communication network through a second base station;
   sending an internet protocol (IP) address allocation request to the router;
   receiving an IP address allocated for the user equipment from the router; and
   establishing a connection between the user equipment and the router utilizing the allocated IP address through the first base station and the second base station.

2. The method of claim 1, wherein the router is connected to a broadband network, the method further comprising:
   connecting the user equipment to the broadband network through the connection between the user equipment and the router.

3. The method of claim 1, wherein the router is connected to the mobile communication network with a subscriber identification module (SIM) card.

4. The method of claim 3, wherein the router is bound to the user equipment with an identification of the SIM card.

5. The method of claim 1, wherein the first base station and the second base station are the same base station, and wherein the data packages are transmitted between the user equipment and the router through the same base station.

6. The method of claim 1, wherein the first base station is different from the second base station, and wherein a tunnel is established between the first base station and the second base station, and wherein the connection between the user equipment and the router includes a radio connection established between the user equipment and the first base station, and wherein a second radio connection is established between the second base station and the router, and wherein the tunnel is utilized to communicate between the first base station and the second base station.

7. A system comprising:
   one or more processors;
   a memory coupled to at least one of the one or more processors;
   a set of computer program instructions stored in the memory and executed by at least one of the one or more processors in order to perform actions of:
   receiving a request from a user equipment, the user equipment being connected to a mobile communication network through a first base station;
   determining a router bound to the user equipment, the router being connected to the mobile communication network through a second base station;
   sending the internet protocol (IP) address allocation request to the router;
   receiving an IP address allocated for the user equipment from the router; and
   establishing a connection between the user equipment and the router utilizing the allocated IP address through the first base station and the second base station.

8. The system of claim 7, wherein the router is connected to a broadband network, and the actions further comprising:
connecting the user equipment to the broadband network through the connection between the user equipment and the router.

9. The system of claim 7, wherein the router is connected to the mobile communication network with a subscriber identification module (SIM) card.

10. The system of claim 9, wherein the router is bound to the user equipment with an identification of the SIM card.

11. The system of claim 7, wherein the first base station and the second base station are the same base station, and wherein the data packages are transmitted between the user equipment and the router through the same base station.

12. The system of claim 7, wherein the first base station is different from the second base station, and wherein a tunnel is established between the first base station and the second base station, and wherein the connection between the user equipment and the router includes a radio connection established between the user equipment and the first base station, and wherein a second radio connection is established between the second base station and the router, and wherein the tunnel is utilized to communicate between the first base station and the second base station.

13. A computer program product comprising a computer readable storage medium having program instructions embodied therewith, wherein the program instructions being executable by a device to perform a method comprising:
receiving a request from a user equipment, the user equipment being connected to a mobile communication network through a first base station;
determining a router bound to the user equipment, the router being connected to the mobile communication network through a second base station;
sending an internet protocol (IP) address allocation request to the router;
receiving an IP address allocated for the user equipment from the router; and
establishing a connection between the user equipment and the router utilizing the allocated IP address through the first base station and the second base station.

14. The computer program product of claim 13, wherein the router is connected to a broadband network, and the method further comprising:
connecting the user equipment to the broadband network through the connection between the user equipment and the router.

15. The computer program product of claim 14, wherein the router is connected to the mobile communication network with a subscriber identification module (SIM) card.

16. The computer program product of claim 13, wherein the first base station and the second base station are the same base station, and wherein the data packages are transmitted between the user equipment and the router through the same base station.

17. The computer program product of claim 13, wherein the first base station is different from the second base station, and wherein a tunnel is established between the first base station and the second base station, and wherein the connection between the user equipment and the router includes a radio connection established between the user equipment and the first base station, and wherein a second radio connection is established between the second base station and the router, and wherein the tunnel is utilized to communicate between the first base station and the second base station.

* * * * *